US005980785A

United States Patent [19]

Xi et al.

[11] Patent Number: 5,980,785
[45] Date of Patent: Nov. 9, 1999

[54] METAL-CONTAINING COMPOSITIONS AND USES THEREOF, INCLUDING PREPARATION OF RESISTOR AND THERMISTOR ELEMENTS

[75] Inventors: Xiaomei Xi, Carlsbad; Sam Fu, Del Mar; Goran Matijavesic, San Clemente; Lutz Brandt, Carlsbad; Catharine Gallagher, San Marcos; Pradeep Gandhi, Del Mar, all of Calif.

[73] Assignee: Ormet Corporation, Carlsbad, Calif.

[21] Appl. No.: 08/942,368

[22] Filed: Oct. 2, 1997

[51] Int. Cl.⁶ .............................. H01B 1/02; H01B 1/00; C08J 3/00; C08K 3/08
[52] U.S. Cl. .......................... 252/512; 252/500; 252/513; 252/514; 524/439
[58] Field of Search ..................................... 252/512, 500, 252/513, 514; 524/439

[56] References Cited

U.S. PATENT DOCUMENTS

| | | | |
|---|---|---|---|
| 2,324,961 | 7/1943 | Stoffel | 201/75 |
| 2,795,680 | 6/1957 | Peck | 201/63 |
| 2,866,057 | 12/1958 | Peck | 201/63 |
| 3,173,885 | 3/1965 | Short | 252/503 |
| 3,932,312 | 1/1976 | Kazmierowicz | 252/518 |
| 4,075,757 | 2/1978 | Malm et al. | 29/625 |
| 4,160,081 | 7/1979 | Kvita et al. | 528/93 |
| 4,331,286 | 5/1982 | Miyazaki et al. | 228/198 |
| 4,332,081 | 6/1982 | Francis | 29/612 |
| 4,377,505 | 3/1983 | Eichelberger et al. | 252/512 |
| 4,404,237 | 9/1983 | Eichelberger et al. | 427/96 |
| 4,479,890 | 10/1984 | Prabhu et al. | 252/508 |
| 4,503,090 | 3/1985 | Brown et al. | 427/96 |
| 4,517,837 | 5/1985 | Oyama et al. | 73/202 |
| 4,539,223 | 9/1985 | Hormadaly | 427/102 |
| 4,587,040 | 5/1986 | Tosaki et al. | 252/519 |
| 4,609,913 | 9/1986 | Arbogast et al. | 340/622 |
| 4,640,866 | 2/1987 | Suzuki | 428/422 |
| 4,652,397 | 3/1987 | Nair | 252/513 |
| 4,695,504 | 9/1987 | Watanabe et al. | 428/209 |
| 4,747,211 | 5/1988 | Gilleo et al. | 29/852 |
| 4,789,411 | 12/1988 | Eguchi et al. | 148/24 |
| 4,870,746 | 10/1989 | Klaser | 29/620 |
| 4,906,406 | 3/1990 | Hormandaly | 252/519 |
| 4,921,777 | 5/1990 | Fraenkel et al. | 430/314 |
| 4,952,902 | 8/1990 | Kawaguchi et al. | 338/22 |
| 4,954,226 | 9/1990 | Mahmoud | 204/15 |
| 4,960,236 | 10/1990 | Hedges et al. | 228/180 |
| 4,961,999 | 10/1990 | Hormadaly | 428/427 |
| 4,967,314 | 10/1990 | Higgins, III | 361/414 |
| 4,968,964 | 11/1990 | Nagai et al. | 338/22 |
| 4,996,005 | 2/1991 | Saito et al. | 252/512 |
| 5,057,811 | 10/1991 | Strott et al. | 338/22 |
| 5,122,302 | 6/1992 | Hormadaly | 252/518 |
| 5,139,819 | 8/1992 | Frentzel et al. | 427/55 |
| 5,148,355 | 9/1992 | Lowe et al. | 361/410 |
| 5,200,264 | 4/1993 | Frentzel | 428/323 |
| 5,214,738 | 5/1993 | Nakajima et al. | 338/22 |
| 5,272,596 | 12/1993 | Honore et al. | 361/633 |
| 5,276,955 | 1/1994 | Noddin et al. | 29/593 |
| 5,376,403 | 12/1994 | Capote et al. | 427/96 |
| 5,391,223 | 2/1995 | Dougherty et al. | 106/1.19 |
| 5,440,805 | 8/1995 | Daigle et al. | 29/830 |
| 5,451,365 | 9/1995 | Barsoum | 419/10 |
| 5,470,643 | 11/1995 | Dorfman | 428/206 |
| 5,491,118 | 2/1996 | Hormadaly | 501/20 |
| 5,538,789 | 7/1996 | Capote et al. | 428/344 |
| 5,716,663 | 2/1998 | Capote et al. | 427/96 |

FOREIGN PATENT DOCUMENTS

WO 95/13901  5/1995  WIPO .......................... B23K 35/34

OTHER PUBLICATIONS

Strumpler, "Polmer composite thermistors for temperature and current sensors" *J. Appl. Phys.* 80 11): 6091–6096 (1996).

*Primary Examiner*—Yogendra Gupta
*Assistant Examiner*—John M. Petruncio
*Attorney, Agent, or Firm*—Gray Cary Ware & Freidenrich; Stephen E. Reiter; Ramsey R. Stewart

[57] ABSTRACT

In accordance with the present invention, there are provided novel metal-containing compositions useful for the preparation of electrical resistance devices (e.g., resistors and thermistor elements). Compositions according to the invention comprise at least one low melting point metal material, and optionally a higher melting point metal material, with the further presence of a binder system also being optional. Compositions according to the invention exhibit a wide range of resistivity and a wide range of values for temperature coefficient of resistance (TCR). Compositions with low values for TCR are useful for resistor applications while compositions with large values for TCR are useful for thermistor applications. Resistor or thermistor elements can be produced by applying compositions according to the invention onto suitable substrates and subsequently alloying (i.e., curing and/or sintering) the compositions. During curing/sintering, the metal or metal alloy powders undergo transient liquid phase sintering to form a continuous metallurgical network. The electrical conduction of the resulting resistor and/or thermistor elements is achieved as a result of the continuous metallurgical network. Resistance and values for TCR of resistors and/or thermistors prepared employing compositions according to the invention are dependent on the intermetallic compounds formed as a result of the alloying/sintering process. Resistors and thermistor elements formed employing compositions according to the invention are stable up to approximately 250° C. and can be used in the temperature range of about −50° C. up to about 200° C. These metal-containing compositions are compatible with polymer, metal and other types of substrates, are highly reliable as compared to existing technology.

70 Claims, No Drawings

METAL-CONTAINING COMPOSITIONS AND USES THEREOF, INCLUDING PREPARATION OF RESISTOR AND THERMISTOR ELEMENTS

FIELD OF THE INVENTION

The present invention relates to compositions useful for making electrical resistance devices such as resistors and thermistor elements. In another aspect, the present invention relates to methods for producing resistor and thermistor elements.

BACKGROUND OF THE INVENTION

There has been an increasing demand for smaller electronic devices, especially multifunctional electronic devices. To meet this demand, embedding passive components (such as resistors, capacitors, and inductors) into the substrate has been attracting increased levels of attention. This embedding technology could provide a cost-effective way to remove passive components from the surface of the substrate, thereby providing performance, space and cost advantages. Embedded passive components have been fabricated in hybrid packaging MCM-C employing the well developed thick film technology. However, the high processing temperature (>700° C.) of the thick film passive components limits their use to applications which employ only ceramic substrate. Efforts have also been made to produce polymer-based printed wiring boards using MCM-L by developing polymer thick film (PTF) technology for applications in low temperature substrates. These efforts have produced polymer thick film conductors and polymer thick film resistors.

A polymer thick film resistor is a mixture of a polymer binder, a conductive material (usually in fine powder form), and a suitable organic solvent. Currently, the majority of commercially available PTF resistor pastes are in the form of thermosetting or thermoplastic resin pastes with carbon or graphite powders as conductive phase. The carbon-containing PTF resistor paste can be applied on a suitable substrate using screen printing, stencil printing or other techniques. Following the drying process, the printed pastes are cured at relatively low temperature, usually <300° C. The cured polymer binder provides adhesion to the substrate. It also shrinks and compresses the conductive particles together, causing electrical conduction to occur. The cured polymer binder also binds the resistor material to the substrate. The electrical conduction of the resistor is the result of the physical contacts between the particles. The resistance of the system depends on the resistance of the materials incorporated into the polymer binder, as well as their particle sizes and load. The inherent problem associated with this approach is that the resistance of the composite resistor material is highly dependent on the interparticle contact. While the compressing force created by the polymer binder is highly dependent on the temperature and humidity conditions. As a result, this resistor system is inherently unstable and exhibits poor environmental reliability over time. In addition, these resistor compositions also suffer from poor compatibility between the copper or other conductor leads.

Thermistors are thermally sensitive resistors with very large values for temperature coefficient of resistance (TCR), which values can be positive or negative. A thermistor with a positive TCR (PTC) exhibits an increase in resistance with increasing temperature, while a thermistor with a negative TCR (NTC) exhibits a decrease in resistance with increasing temperature. Thermistors are used extensively in such applications as temperature sensors, electronic time delay elements, gas pressure sensors, voltage or current limitors, thermal conductivity detectors, liquid or gas flow sensors, solid or liquid level indicators, and the like.

PTC thermistors have conventionally been fabricated by sintering barium titanate at 1200° C.–1400° C. in air. NTC thermistors ordinarily consist of sintered semiconductor materials which have an NTC characteristic. Thick film thermistor pastes usually comprise powders with thermistor characteristics, a glass binder, and an organic vehicle. Thermistor elements have been produced by screen printing the thermistor paste on an insulating substrate, usually ceramic, and subsequently firing at temperatures higher than 700° C. Thick film thermistors can provide large values for TCR and a wide range of resistance. However, the high processing temperature (>700° C.) limits them to mostly only ceramic applications.

The development of polymer thick film thermistor pastes has been limited due to the fact that high TCR materials are usually semiconductors which need to be sintered at high temperature. The highest acceptable processing temperatures of polymer thick film technology (<300° C.) are too low to accomplish semiconductor sintering. Alternatively, most pure metal elements exhibit large positive values for TCR. However, the low resistance of the metals and the high sensitivity of the TCR value to impurities prohibit them from being used for many applications.

OBJECTS OF THE INVENTION

In order to overcome the shortcomings of prior art resistor and thermistor compositions, it is an objective of this invention to produce compositions useful for preparation of electrical resistance devices such as resistor and thermistor elements.

A further objective of the present invention is to use invention compositions to produce electrical resistance devices such as resistors and thermistors which have high reliability, high temperature stability, environmental stability, compatibility with conductor materials, process and operational stability, and the like.

These and other objects of the invention will become apparent upon review of the specification and appended claims.

BRIEF DESCRIPTION OF THE INVENTION

In accordance with the present invention, we have developed novel metal-containing resistor and thermistor compositions useful for the preparation of electrical resistance devices, or more specifically transient liquid phase sintering (TLPS) resistor and thermistor elements. Invention compositions contain at least one low melting point metal material (e.g., a low melting point metal powder, or a powdered low melting point metal alloy), optionally a higher melting point metal material (e.g., a high melting point metal powder, or a powdered high melting point metal alloy), and optionally, a binder system. During curing, alloying of the low (and optionally, high) melting point material(s) occurs through transient liquid phase sintering, thereby forming intermetallic compositions with new resistance properties.

In accordance with another aspect of the present invention, there are provided methods employing invention compositions for the preparation of resistor and thermistor elements. Electrical resistance devices prepared according to the invention can be obtained by depositing the metal-containing compositions on suitable substrates. Deposition can occur in a variety of ways depending on the particular composition employed, but may include using screen printing, stencil printing, dispensing, electrostatic transfer, doctor blading into photoimaged or otherwise preformed patterns, or other techniques known to those skilled in the art. These compositions can also be formed by any of the other techniques used in the composites industry including pressing, lamination, extrusion, molding, and the like. Curing is accomplished by any number of standard reflow curing methods including convection heating, forced air convection heating, vapor phase condensation heating, conduction heating, infrared heating, induction heating, or other techniques known to those skilled in the art. During curing, the low melting point metal material(s) melt and react with other low melting point metal material(s) and/or with the optional relatively high melting point metal material(s), which do not melt at the cure temperature, to form a continuous metallurgical network, as well as appropriate intermetallic compounds. Conductivity is provided by the continuous metallurgical network. The resistance and the TCR value of devices made using invention compositions are a result of the intermetallic compounds formed during the transient liquid phase sintering process.

In accordance with the present invention, electrical resistance devices are produced by creating a conductive metal network from several different metal or metal alloy powders in situ at low temperatures (<300° C.). Resistor or thermistor paste compositions are prepared by combining low melting point metal material(s) with other low or high melting point metal material(s), along with a binder system. By melting at least one of the low melting point metal material(s), and alloying this material with other metal materials present in the formulation, a continuous metallurgical network is formed during the curing process. High melting point metal material(s) may optionally be added to form the metallurgical network. The electrical conductivity of the cured composition is achieved as a result of the continuous metallurgical network. The resistance and values for TCR of the cured resistor and thermistor are largely due to the intermetallic compounds formed by alloying during the curing process.

DETAILED DESCRIPTION OF THE INVENTION

The present invention was designed not only to obviate the shortcomings of the heretofore known resistor and thermistor compositions, but also to develop resistor and/or thermistor compositions which have more desirable properties in comparison with the currently available resistor and thermistor compositions.

Therefore, in accordance with the present invention, there are provided compositions useful for the preparation of resistor and/or thermistor elements, said compositions comprising:

(1) 15–100 wt % of a combination of at least two different finely-divided metal materials, wherein said combination produces an intermetallic structure upon low temperature curing, (2) 0–90 wt % of a binder system, and (3) 0–50 wt % of inorganic fillers.

The development of the above mentioned resistor and thermistor compositions represents a new use of transient liquid phase-sintering (TLPS) technology. The present invention produces resistor and thermistor elements in situ during cure from low melting point metal material (s), optionally in combination with relatively high melting point metal material(s). The individual metal material(s) described herein for use in accordance with the present invention do not alone have the appropriate resistor or thermistor characteristics prior to curing/sintering. The curing which occurs during TLPS forms a continuous metallurgical network having desirable resistor or thermistor characteristics.

Resistor and thermistor compositions according to the invention are formed by combining or dispersing the appropriate metal materials, optionally in the presence of an appropriate binder system. The binder may be simply a solvent which will evaporate during the curing process or may contain polymers or other materials which will become a permanent part of the cured resistor and thermistor compositions. The electrical resistance devices contemplated by the present invention can be formed by applying the above-described composition onto suitable substrates using screen printing or other techniques known to those skilled in the art and subsequently curing the printed paste. During curing, the low melting point metal material(s) melt, react with other low melting point metal material(s) present in the reaction medium and/or with the high melting point metal material(s) to form a continuous metallurgical network. The binder portion of the composition, if present, either burns out during the curing operation, as in the case of a solvent binder, or forms an integral part of the network, as in the case of a polymer. If a polymer is used in the binder system, the cured polymer network forms an interpenetrating network with the metallurgical network and also binds the resistor and thermistor elements to the substrates. As a consequence, invention resistor and thermistor compositions exhibit excellent properties and have several advantages in comparison with prior art resistor and thermistor compositions, e.g., (a) Compatibility with copper leads and low temperature substrates, (b) Good temperature stability, (c) High reliability, (d) Low TCRs (<300 ppm/°C.) for resistor compositions and high TCRs for thermistor compositions, and (e) Easy processability.

The present invention is the result of a novel application of the TLPS technique, creating metal alloys and/or intermetallic compounds with desired resistor and/or thermistor characteristics. Resistor and thermistor elements can be produced through curing or sintering metallic powder mixture(s) at low temperatures (<300° C.) in an oven, a furnace, on a hot plate, in a hot press, or by other curing methods known to those skilled in the art. During curing/sintering, the low melting point metals or metal alloy powders melt and react with each other and/or with the high melting metal or metal alloy powder to form relatively high melting point alloys and/or intermetallic compounds with resistor and/or thermistor characteristics. A printable resistor/thermistor paste can be prepared by simply dispersing the metallic powders into a solvent or a polymeric binder. A resistor/thermistor element can be produced by printing the paste onto a suitable substrate and subsequently drying out the solvent and curing/sintering it.

Therefore, the resistor and thermistor compositions of the invention comprise only one primary component, i.e.:

a mixture of low melting point metal or low melting point metal alloy powders.

Depending upon the performance requirements of the resistor/thermistor elements, the preferred resistor/thermistor compositions may contain a combination of the following components:

(1) At least one low melting point metal material, which may or may not possess resistor/thermistor characteristics alone or in combination with one another, (2) Optionally, a relatively high melting point metal material which can react with the low melting point metal material(s) and form intermetallic compounds with resistor/thermistor characteristics, (3) Optionally, a binder system which may include one or more of the following:
   a solvent,
   a polymer,
   a curing agent,
   a fluxing agent, or
   a fluxing agent that also acts as a curing agent, and (4) Optionally, an inorganic filler.

In preparing the composition, the proportion of the components (1)–(4) may be varied over a considerable range and still yield compositions useful for making controlled electrical resistance devices such as resistors or thermistors. Useful resistors or thermistors can be achieved with compositions comprising:

15–100% by weight of component (1),
   0–85% by weight of component (2),
   0–85% by weight of component (3), and
   0–50% by weight of component (4).

Preferably, for applications on polymer and metal substrates, the resistor or thermistor compositions contain the components (1)–(4) within the following range:

Component (1): 30–85% of the weight of the composition,
   Component (2): 5–45% of the weight of the composition,
   Component (3): 15–40% of the weight of the composition, and
   Component (4): 2–20% of the weight of the composition.

The low melting point metal material(s) (1) may contain Sn, Pb, Bi, Se, Ga, In, Zn, Tl, Sb, Hg, Po, and the like, as well as alloys of other metals having a melting point lower than about 300° C. Typically, the particle sizes of these materials are in the range of about 1–100 $\mu$m. Preferably, the average particle sizes are in the range of about 1–20 $\mu$m. The principle requirement for the low melting point metal material(s) is that they can wet and react with each other and/or with high melting point metal material(s) during the curing process. In order for this to occur, the low melting point metal material(s) must have a high wettability and reactivity to each other and/or to the high melting point metal material (s). The preferred low melting point metal material(s) contemplated for use in accordance with the present invention contain Se, Zn, In, Pb, Sn, Ga, Bi, and the like.

The optional high melting point metal material (s) (2) may contain Mo, Fe, W, Mg, Cd, Sb, Te, Mn, Nb, As, Al, Ni, Ag, Au, Co, Pt, Cu, Ge, Zn, NiTe, NiS, NiSn, and the like, as well as other high melting point metal materials having a melting point above about 300° C. The primary requirement for this high melting metal material is that it can react with the molten low melting point metal material(s) to form a continuous metallurgical network and intermetallic compounds with desirable resistor/thermistor characteristics. The presently preferred high melting point metal material (s) contemplated for use herein for the preparation of resistor compositions are Ni, Ag, Al, Te and As. The presently preferred high melting point metal material (s) contemplated for use herein for the preparation of thermistor compositions are Mo, Fe, W, Mg, Cd, Ag, Al, Zn, Cu, As, and the like. To achieve high TCR for the cured thermistor elements, forming more than one high TCR intermetallic compounds is desirable. This can be achieved by dispersing more than one kind of high melting point metal material into the composition. Typically, the particle size of the high melting point metal material(s) is in the range of about 1–100 $\mu$m. The preferred particle size is in the same range with the low melting point metal material(s), i.e., about 1–20 $\mu$m.

The optional binder system contemplated for use herein functions in one or more of the following ways. One function is to act as a carrier in which the metallic powders are dispersed. An optional function is to bind the resistor/thermistor together and also bond the resistor/thermistor elements to the substrate after curing. Yet another function is to act as a fluxing agent. In the circumstance where the binder is a solvent, it can be any one of the known solvents, such as acetone, alcohol, etc. In the circumstance where the binder includes a polymer resin, the resin may be any resin which can be cross-linked by a curing agent. Resins which meet this requirement include but are not limited to epoxies, phenolics, novalacs, polyurethanes, polyimides, bismaleimides, maleimides, cyanate esters, polyesters, polyvinyl alcohol, and polyureas. Presently, the preferred resin is epoxy resin.

Inorganic fillers contemplated for use herein are inorganic materials which can improve the packing density of the cured resistor/thermistor elements while not having a detrimental effect on the overall resistor/thermistor characteristics of the resistor/thermistor elements. To fulfill these requirements, the inorganic fillers should be wetted by the binder system or the molten metallic system in the composition. Appropriate inorganic fillers are fine inorganic powders such as, for example, graphite, carbon, BN, $Al_2O_3$, $SiO_2$, $SnO_2$, $TiO_2$, CuO, $Cu_2O$, $Nb_2O_5$, $MoSi_2$, $As_2Se_3$, and the like, as well as other inorganic fillers. Typically, the particle size of the inorganic fillers can be in the range of 1–100 $\mu$m. The preferred particle sizes are in 1–20 $\mu$m range.

In preparing resistor/thermistor compositions according to the invention, the binder system is usually prepared first. After the metallic powders are weighed and mixed, the binder system is mixed with the metallic powders. The dispersion of the metallic powders into the binder system is achieved using high speed shearing provided by a mechanical stirrer. The mixed resistor/thermistor pastes can then be stored in a refrigerator for an extended period of time. The resistor/thermistor pastes thus stored can be made ready for use by simply allowing them to equilibrate at room temperature.

When the resistor/thermistor elements are produced as discrete elements, the techniques used in the industries such as pressing, lamination, extrusion, molding, and other techniques known to the composites industry, can be used. The cure by transient liquid phase sintering is accomplished by any of the standard heating/sintering methods including convection heating, forced air convection heating, condensation heating, conduction heating, infrared heating, induction heating, or other techniques known to those skilled in the art. The formed resistor or thermistor elements are ready for testing and applications.

When processing of resistor or thermistor elements is done on a substrate, it is similar to the processing of other thick film products, such as ceramic and polymer thick film pastes, or solder pastes used in the electronic industry. The resistor/thermistor composition can be applied on a suitable substrate, usually polymer substrate, using screen printing, stencil printing, dispensing, electrostatic transfer, doctor blading into photoimaged or otherwise preformed patterns, or other techniques known to those skilled in the art. Resistor/thermistor elements can be obtained by drying the printed pastes to drive out any solvent that may be present, and subsequently curing the paste to form a continuous metallurgical network.

The invention will now be described in greater detail by reference to the following non-limiting examples.

TEST METHODS

Resistance Measurement (a) On a resistor or thermistor without leads: The resistances were measured using a multimeter. The resistance measurement is carried out by placing the multimeter probes on the ends of resistor and/or thermistor samples.

(b) On a resistor or thermistor with copper leads: The resistance measurements were conducted using a specially designed test board. On this test board, 1 mil thick copper leads distributed in such a way that resistor/thermistor elements in 2 mm×2 mm square sizes can be constructed between the copper leads. The compositions were screen printed on the test boards and subsequently dried and cured. The resistance values were then measured in $\Omega/\square$ (sheet resistance) by placing the multimeter probes on the copper leads.

TCR measurement

The values for TCR of resistors and thermistors were obtained by measuring the resistance at room temperature ($T_1$) and the resistance at elevated temperature ($T_2$). The values for TCR can be calculated using the equation below:

$$TCR = \frac{R_{T1} - R_{T2}}{R_{T1}(T_2 - T_1)} \times 10^6 \text{ ppm/}°C.$$

in which $R_{T1}$ is the resistance value at room temperature $T_1$ (°K.), and $R_{T2}$ is the resistance value at elevated temperature $T_2$ (°K.). The thermistor constant (B) can be obtained using the following equation:

$$B = \frac{\ln \frac{R_1}{R_2}}{\frac{1}{T_1} - \frac{1}{T_2}}$$

in which $R_1$ and $R_2$ are resistance values at temperatures $T_1$ (°K.) and $T_2$ (°K.), respectively.

Thermal analysis

The cured resistor or thermistor pastes are scraped off and the scraped powders were then analyzed using a Differential Scanning Calorimeter (DSC) to determine the completion of the reaction.

Reliability testing

The reliability of resistors prepared according to the invention was tested by measuring the resistance changes during 15 thermal shocks from room temperature to 215° C.

EXAMPLES FOR THERMISTOR APPLICATIONS

Example 1

A demonstration of achieving transient liquid phase sintering with a metallic powder mixture only, was made. The metallic powder mixture was prepared by weighing appropriate amounts of low melting point metal or metal alloy powders and a high melting point metal powder and subsequently mixing them thoroughly in a container. The mixed metallic powder mixture had the following composition:

the low melting point metals or metal alloys (Se (44.5 wt %) and BiSn (44.589 wt %), and the high melting point metal or metal alloy As (11 wt %) The metallic powder mixture was then analyzed using a Differential Scanning Calorimeter (DSC). To demonstrate the transient liquid phase sintering, the metallic powder mixture was scanned for the second time from 20° C. to 360° C. after the first scan was carried out from 20° C. to 270° C. The results are shown in Table 1.

TABLE 1

| No. of DSC scan | The first melting point (DSC endothermic peak) | The second melting point (DSC endothermic peak) | Intermetallic reaction (DSC exothermic peak) |
|---|---|---|---|
| First scan | 135° C. (BiSn melt) | 215° C. (Se melt) | 220° C. |
| Second scan | 270° C. (alloy/intermetallic) | — | — |

As shown in Table 1, the first scan exhibited two low melting points (135° C. for BiSn and 215° C. for Se) and an intermetallic reaction temperature (220° C.). While the second scan showed only the melting point formation of a higher melting point (270° C.) alloy or/and intermetallic compound which formed during the TLPS process of the first scan. A pellet with 3 mm in diameter and 1 mm in thickness was formed as a result of the DSC scans. A resistance of 205 Ω was measured by placing the probes on the edges of the pellet. This result demonstrates that TLPS can be achieved through alloying metallic powder mixture alone at low temperature (<300° C.).

Example 2

An illustration of producing thermistor elements by using a thermistor paste made from dispersing a metallic powder mixture into a solvent which acts as a binder, was made. The same metallic powder mixture used in Example 1 was used in this example. The thermistor paste was prepared by dispersing the metallic powder mixture into acetone, with the final composition containing the following components:

the metallic powder mixture (85 wt %), and
acetone (15 wt %).

Thermistor elements were produced by stencil printing the thermistor composition on anodized aluminum substrates and subsequently drying and sintering the printed composition. The sintered thermistor elements had a dimension of 2.45"×0.75"×0.001". The resistances were measured over the range of 20° C. to 80° C. using a multimeter. Values for TCR were calculated based on measurements taken in the temperature range from 20° C. to 80° C. The results are reported in Table 2.

TABLE 2

| Processing method | Processing result | Sample appearance | Resistance at 20° C. (Ω) | $TCR_{20-80° C.}$ (ppm/° C.) |
|---|---|---|---|---|
| 10 minutes at 215° C. in a condensation oven | incomplete sintering | powder form | — | — |
| 10 minutes at 280° C. on a hot plate | complete sintering | continuous metallic sheet | 760 | −5510 |

Example 3

This example demonstrates thermistor formulations in which only the low melting point metal or metal alloy powders are dispersed in a polymer binder system. The polymer binder system was prepared by incorporating desired amounts of curing agent, solvent and other additives into the epoxy resin system and thoroughly mixing them. The prepared polymer binder system had the following composition:

epoxy resin—18.9 wt %;
protected curing agent (54.2 wt %);
solvent (25.2 wt %); and
rheological modifier (1.7 wt %).

This polymer binder system was then ready for formulating thermistor pastes and can be kept in a refrigerator for an extended time.

The compositions of the polymer thick film pastes were prepared using the method indicated above, with the final compositions containing the following proportions by weight of the total composition:

polymer binder (15 to 25 wt %);
low melting point alloys (75 to 85 wt %).

The compositions were stencil printed on FR-4 substrates and cured in a condensation oven at 215° C. for 15 minutes after being dried at 120° C. for 5 minutes in a convection oven. The cured thermistor element has a dimension of 2.45"×0.75"×0.001". The resistance values were measured using a multimeter by placing the probes at the ends of the thermistor element. The TCR and thermistor constant values were measured in the temperature range of 20° C. to 80° C. The results are reported in Table 3, in which both the Se metal and BiSn are low melting point metals.

TABLE 3

| | Compositions of the formulations | | | | |
|---|---|---|---|---|---|
| | Polymer | low melting metals | | Resistance | |
| No. | binder (wt %) | Se (wt %) | BiSn (wt %) | at 20° C. (KΩ) | TCR (ppm/° C.) | Thermistor constant (B) |
| 3A | 18.4 | 40.8 | 40.8 | 4.42 | −4050 | 470 |
| 3B | 19.1 | 45.4 | 35.4 | 23.8 | −4500 | 560 |
| 3C | 19.9 | 50.6 | 29.5 | 88 | −6200 | 796 |
| 3D | 20.8 | 56.1 | 23.1 | 3,780 | −6600 | 870 |

Example 4

A comparison of incorporation of various high melting point metals or metal alloys was made in this example. To give a clear showcase, only one type of high melting metal or metal alloy was incorporated into each composition. The thermistor compositions were prepared as indicated above using the same polymer binder system as in Example 3 with final compositions containing:

polymer binder (15 to 25 wt %);
low melting metal alloys (35 to 80 wt %); and
high melting point metal or metal alloy (5 to 50 wt %).

The thermistor elements were fabricated and tested using the same method as described in Example 3. The results are listed in Table 4.

TABLE 4

| No | | 4A | 4B | 4C | 4D | 4E | 4F | 4G |
|---|---|---|---|---|---|---|---|---|
| Polymer binder (wt %) | | 16.7 | 20.4 | 19.4 | 16.5 | 15.9 | 16.4 | 16.2 |
| low melting metals | Se (wt %) | 37.2 | 43.6 | 39.0 | 41.9 | 35.3 | | 35.9 |
| | BiSn (wt %) | 37.2 | 25.4 | 30.4 | 24.4 | 35.3 | 35.3 | 35.9 |
| High melting metals | As (wt %) | 8.9 | 10.6 | 11.3 | 14.2 | | | |
| | Sb (wt %) | | | | | 13.5 | | |
| | NiS (wt %) | | | | | | | 12.0 |
| | Te (wt %) | | | | | | 47.3 | |

TABLE 4-continued

| No | 4A | 4B | 4C | 4D | 4E | 4F | 4G |
|---|---|---|---|---|---|---|---|
| Resistance at 20° C. (KΩ) | 2.15 | 524 | 110 | 250 | 1.0 | 0.075 | 0.91 |
| TCR (20–80° C.) (ppm/° C.) | −2400 | −10800 | −9000 | −10100 | −2040 | +1050 | −1600 |
| Thermistor Constant (B) | 285 | 1685 | 1308 | 1620 | 230 | −80 | 175 |

Table 4 shows that a variety of low melting metals or alloys and high melting metals or alloys can be combined to create a number of useful thermistor compositions.

Example 5

This example is designed to illustrate the effects of dispersing more than one type of high melting point metal or metal alloy in a polymer binder system on the thermistor properties. The polymer binder system used in Example 3 was used in this example. The compositions and thermistor elements were prepared using the same method as described in Example 3 with the final compositions containing:

polymer binder (15 to 25 wt %);
low melting point powder (25 to 70 wt %);
high melting point metal or metal alloy (5 to 60 wt %.

The thermistor test samples were prepared and their properties were tested using the same method as that used in the preceding two examples. The results are reported in Table 5. The values for TCR of the thermistor pastes generally increase with the addition of more than one type of high melting metal or metal alloys into the composition.

Example 6

The effect of incorporating inorganic fillers into the compositions are illustrated using this example. The purpose of introducing inorganic fillers into the composition is to create more dense increase the density of the cured thermistor elements and thus increase their reliability. Only small amounts of the inorganic fillers are needed in the compositions. The thermistor compositions were prepared using the same method as indicated in Example 3 with the final compositions containing:

polymer binder (15 to 25 wt %);
low melting point metal or metal alloy powder (40 to 70 wt %);
high melting point metal (5 to 45 wt %); and
inorganic fillers (2 to 10 wt %).

The same preparation and testing methods used in the previous examples were used in this example for preparing the samples and testing the thermistor properties. The compositions and testing results are listed in Table 6.

TABLE 5

| No. | | 5A | 5B | 5C | 5D | 5E | 5F | 5G | 5H | 5I | 5J | 5K |
|---|---|---|---|---|---|---|---|---|---|---|---|---|
| polymer binder (wt %) | | 18.0 | 20.2 | 19.1 | 18.9 | 20.8 | 15.0 | 18.2 | 18.2 | 21.2 | 17.8 | 16.8 |
| low melting metal | BiSn (wt %) | 29.3 | 32.7 | 28.5 | 30.7 | 33.6 | 24.2 | 27.1 | 27.1 | 49.3 | 26.6 | |
| | PbSn (wt %) | | | | | | | | | | | 28.3 |
| | In (wt %) | | | | | | | 9.0 | 9.0 | | | |
| | Se (wt %) | 29.3 | 32.7 | 28.5 | 30.7 | 33.6 | 24.2 | 27.1 | 27.1 | 24.4 | 26.6 | 18.0 |
| High melting metal | As (wt %) | 7.0 | 7.9 | 6.8 | 7.3 | 8.1 | 5.8 | 6.5 | 6.5 | 3.2 | 6.4 | 4.2 |
| | Al (wt %) | | | | | | | | | 1.9 | | |
| | Te (wt %) | 16.4 | | | | | | | | | | 32.8 |
| | Zn (wt %) | | 6.5 | 17.1 | | | | 12.1 | | | 11.9 | |
| | Cd (wt %) | | | | | | | | 12.1 | | | |
| | Fe (wt %) | | | | 12.4 | | | | | | | |
| | W (wt %) | | | | | | 30.8 | | | | | |
| | Mg (wt %) | | | | | 3.9 | | | | | | |
| | Cu (wt %) | | | | | | | | | | 10.7 | |
| Resistance (KΩ) | | 101 | 245 | 930 | 16 | 280 | 70 | 960 | 96 | 10.6 | 2 | 130 |
| TCR (ppm/° C.) | | −10150 | −10200 | −11500 | −6300 | −11300 | −7700 | −10700 | −7900 | −7100 | −2850 | −6900 |
| Thermistor constant (B) | | 1560 | 1630 | 2037 | 810 | 1850 | 1150 | 1841 | 1250 | 1070 | 350 | 1040 |

TABLE 6

| No. | | 6A | 6B | 6C | 6D | 6E | 6F | 6G | 6H | 6I | 6J |
|---|---|---|---|---|---|---|---|---|---|---|---|
| polymer binder (wt %) | | 19.4 | 20.0 | 19.4 | 20.0 | 18.9 | 19.9 | 17.7 | 21.2 | 17.8 | 18.9 |
| low melting metals | BiSn (wt %) | 31.5 | 32.5 | 31.5 | 32.5 | 28.5 | 32.1 | 23.7 | 28.3 | 26.6 | 28.5 |
| | Se (wt %) | 31.5 | 32.5 | 31.5 | 32.5 | 28.5 | 32.1 | 23.7 | 28.3 | 26.6 | 28.5 |
| High melting metals | As (wt %) | 7.6 | 7.8 | 7.6 | 7.8 | 6.6 | 7.7 | 5.6 | 6.8 | 6.4 | 6.6 |
| | Zn (wt %) | | | | | 12.7 | | 10.6 | 12.6 | 11.9 | 12.7 |
| | Cu (wt %) | | | | | | | | | 10.66 | |
| | Ag coated Cu (wt %) | | | | | | | 18.7 | | | |
| Inorg. Fillers | CuO (wt %) | 10.0 | | | | | | | | | |
| | $Nb_2O_5$ (wt %) | | 7.2 | | | | | | | | |
| | $MoSi_2$ (wt %) | | | 10.0 | | | | | | | |
| | $TiO_2$ (wt %) | | | | 7.2 | 4.8 | | | | | |
| | $As_2Se_3$ (wt %) | | | | | | | | | 4.8 | |
| | BN (wt %) | | | | | | 8.2 | | | | |
| | Graphite (wt %) | | | | | | | | 2.8 | | |
| Resistance (KΩ) at 20° C. | | 3.0 | 34.2 | 132.0 | 840 | 5250 | 4500 | 0.96 | 8.3 | 2.16 | 2300 |
| TCR (ppm/° C.) (20° C.–80° C.) | | −3840 | −7370 | −8910 | −11723 | −12303 | −11723 | −3210 | −2160 | −2850 | −11250 |
| Thermistor Constant (B) | | 450 | 1040 | 1319 | 2095 | 2382 | 2095 | 370 | 240 | 330 | 1993 |

Example 7

The resistance and TCR measurements made on a stencil printed one square pattern without copper leads, and a screen printed one square pattern with copper leads were compared. The thermistor pastes used in this example are 5B, 5C, and 6E which are described in Examples 5 and 6. The resistance was measured using a multimeter at 20° C. and at 80° C. The TCR measurements were obtained in the temperature range from 20° C. to 80° C. The results are presented in Table 7.

TABLE 7

| No. | Sheet Resistance (KΩ/□) at 20° C. (without leads) | Sheet Resistance (KΩ/□) at 20° C. (with leads) | TCR (ppm/° C.) (20° C.–80° C.) without leads | TCR (ppm/° C.) (20° C.–80° C.) with leads |
|---|---|---|---|---|
| 5B | 60.4 | 61.4 | −10980 | −11120 |
| 5C | 176.2 | 181 | −10970 | −11800 |
| 6E | 1490 | 1380 | −12690 | −12920 |

Example 8

This example describes the use of a one square thermistor element screen printed on copper leads. TCR and thermistor constants were measured in the temperature range of 25° C. to 125° C. instead of 20° C. to 80° C. as used in the previous examples. The thermistor compositions used in this example are the composition 5C and 6E, as described in Examples 5 and 6. The results are reported in Table 8.

TABLE 8

| No. | Sheet Resistance (KΩ/□ at 25° C.) | Sheet Resistance (KΩ/□ at 125° C.) | $TCR_{25-125° C.}$ (ppm/° C.) |
|---|---|---|---|
| 5C | 163 | 23.5 | −8560 |
| 6E | 1542 | 121 | −9215 |

EXAMPLES FOR RESISTOR APPLICATIONS

Example 9

This example illustrates resistor compositions in which only the low melting point metal or metal alloy powders are dispersed in a polymer binder system. The polymer binder system was prepared by incorporating an appropriate amount of a curing agent, organic solvents and other additives into the epoxy resin system and thoroughly mixing them in a container. The resistor compositions were prepared using the method indicated above with the final compositions containing the following components:

low melting metals or metal alloys (70 to 85 wt %);
the polymer binder system (15 to 30 wt %).

To produce resistor test samples, these resistor compositions were applied onto FR-4 substrates using the stencil printing technique. The resistor samples were obtained by curing the printed resistors at 215° C. for 15 minutes in a condensation oven after drying in a convection oven at 120° C. for 5 minutes. The cured resistor samples have a size of 2.45"×0.75"×0.001". Resistances were measured by placing the multimeter probes on the ends of the resistors and values for TCR were tested in the temperature range of 20° C. to 80° C. The results are presented in Table 9.

compositions were prepared using the same method as described in Example 9, with the final compositions containing the following components:

the low melting point metal or metal alloy powder (20 to 85 wt % of the total composition);

TABLE 9

| | Compositions of the formulations | | | | | Preformance properties | | | |
|---|---|---|---|---|---|---|---|---|---|
| No. | Polymer binder (wt %) | BiSn (wt %) | PbSn (wt %) | Sn (wt %) | Se (wt %) | Resistance (KΩ) | TCR (ppm/° C.) | Remelt temperature (° C.) | Resistance change after 15 thermal shocks |
| 9A | 16.6 | 46.5 | | | 36.9 | 1.62 | −2200 | <215 | 10% |
| 9B | 15.4 | 55.5 | | | 29.1 | 0.696 | −1430 | <215 | 15% |
| 9C | 14.9 | 59.6 | | | 25.5 | 0.141 | −420 | <260 | 4% |
| 9D | 15.3 | 33.9 | | 16.9 | 33.9 | 0.94 | −2200 | <230 | 10% |
| 9E | 19.6 | | 42.8 | | 37.6 | 34.05 | — | <180 | — |

These data show that dispersion of only the low melting point metal or metal alloy powder in the polymer binder system is sufficient to produce resistor pastes with a wide range of resistance values and good thermal stability.

Example 10

This example illustrates resistor compositions in which the low melting metal or metal alloy powder and one type of relatively high melting point metal powder are dispersed in a polymer binder system. The same polymer binder system was used here as described in Example 9. The resistor the high melting metal or metal alloy (2 to 60 wt % of the total composition); and the polymer binder system (15 to 30 wt % of the total composition).

The resistor test samples were prepared and the properties of the resistors were tested using the methods described in Example 9. Resistance values were measured at 20° C. and values for TCR were tested in the temperature range of 20° C. to 80° C. The results are presented in Table 10.

TABLE 10

| No | | 10A | 10B | 10C | 10D | 10E | 10F | 10G | 10H | 10I | 10J | 10K |
|---|---|---|---|---|---|---|---|---|---|---|---|---|
| Polymer binder | | 23.6 | 17.1 | 16.7 | 15.7 | 14.9 | 16.2 | 23.5 | 22.4 | 27.2 | 20.0 | 17.1 |
| Low melting metal | BiSn (wt %) | 40.4 | 24.0 | 37.2 | 35.3 | 69.4 | 35.9 | | | | | |
| | PbSn (wt %) | | | | | | | 35.3 | 23.8 | 28.9 | 21.2 | 38.5 |
| | Se (wt %) | | 37.2 | 35.3 | 12.8 | 35.9 | 35.3 | | | | | |
| high melting metal | As (wt %) | | | 8.9 | | 2.9 | | | | | | |
| | Sb (wt %) | | | | 13.7 | | | | | | | |
| | Fe (wt %) | | | | | | 12.0 | | | | | |
| | Ni (wt %) | 36.0 | | | | | | | 5.9 | | | |
| | V (wt %) | | | | | | | | | 53.8 | | |
| | Cu—Ni (wt %) | | 61.6 | | | | | | | | | |
| | Te (wt %) | | | | | | | | | | | 44.4 |
| | Ti (wt %) | | | | | | | | | 43.9 | | |
| | Nb (wt %) | | | | | | | | | | 58.8 | |
| Resistance (Ω) | | 0.2 | 2.0 | 5200 | 1650 | 4.4 | 1015 | 9800 | 1200 | 23000 | 62000 | 840 |
| TCR (ppm/° C.) | | — | — | −2200 | — | — | −2080 | — | — | — | — | +150 |
| Remelt temperature (° C.) | | 260 | 260 | 260 | 140 | 140 | 215 | 180 | 180 | 180 | 180 | <180 |

Example 11

In this example, a comparison was made of resistor compositions in which low melting metal or metal alloy powders and more than one type of high melting point metal powder were dispersed in a polymer binder system. The polymer binder system was prepared using the same composition as described in Example 9. The resistor pastes were formulated using the method described above, with the final compositions containing:

- the polymer binder system (15 to 25 wt % of the composition);
- the low melting point metals or metal alloys (50 to 65 wt % of the composition); and
- the high melting point metals or metal alloys (10 to 35 wt % of the composition).

The resistor test samples were prepared and their properties were tested using the methods indicated in Examples 9 and 10. The resistance values were measured at 20° C. and values for TCR were tested in the temperature range of 20° C. to 80° C. using the same method as used in Example 9. The results are summarized in Table 11.

mer binder system used in the previous examples was used in this example. The resistor pastes were prepared using the method described in Example 9, with the final compositions containing the following components:

- the polymer binder system (15 to 30 wt % of the composition);
- the low melting point metal or metal alloy (40 to 70 wt % of the composition);
- the high melting point metal or metal alloy (5 to 25 wt % of the composition); and
- inorganic filler(s) (2 to 15 wt % of the composition.

The resistor test samples were fabricated and tested using the same methods as in the previous examples. Resistance values were measured at 20° C. and values for TCR were tested in the temperature range of 20° C. to 80° C. The results are listed in Table 12.

TABLE 11

| No. | | 11A | 11B | 11C | 11D | 11E | 11F | 11G | 11H |
|---|---|---|---|---|---|---|---|---|---|
| Polymer binder (wt %) | | 18.7 | 18.7 | 18.4 | 17.3 | 19.6 | 16.8 | 23.0 | 19.9 |
| low melting metal | BiSn (wt %) | 30.2 | 30.2 | 42.5 | 28.0 | 36.3 | 42.0 | 25.7 | 46.2 |
| | Se (wt %) | 30.2 | 30.2 | 21.1 | 28.0 | 21.2 | 18.0 | 33.0 | 22.9 |
| High melting metal | As (wt %) | 7.2 | 7.2 | 2.7 | 6.7 | 8.8 | 6.0 | 8.0 | 3.0 |
| | NiTe (wt %) | 13.7 | | | | | | | |
| | Ni (wt %) | | 13.7 | 13.7 | 12.5 | 14.2 | | | 6.0 |
| | Al (wt. %) | | | 1.6 | | | | | |
| | Ag (wt. %) | | | | | | 0.4 | | |
| | Cu (wt. %) | | | | | | | | 2.0 |
| | Te (wt. %) | | | | 7.5 | | 16.8 | | |
| | Ni coated carbon (wt %) | | | | | | | 10.3 | |
| Resistance (Ω) | | 820 | 1250 | 50 | 1430 | 93 | 1000 | 440 | 250 |
| TCR (ppm/° C.) | | −210 | −230 | +1600 | −980 | −40 | +100 | +70 | +200 |
| Remelt temperature (° C.) | | 260 | 260 | 260 | 260 | 260 | 140 | 260 | 260 |

Example 12

The effects of inorganic fillers on the properties of invention resistor compositions were evaluated. The same poly-

TABLE 12

| No. | | 12A | 12B | 12C | 12D | 12E | 12F | 12G |
|---|---|---|---|---|---|---|---|---|
| Polymer binder (wt %) | | 28.7 | 28.9 | 25.7 | 27.8 | 27.4 | 19.9 | 31.5 |
| Low melting metal | BiSn (wt %) | 28.7 | 28.9 | 25.7 | 27.8 | 27.4 | 19.9 | 31.5 |
| | Se (wt %) | 28.7 | 28.9 | 25.7 | 35.7 | 27.4 | 34.1 | 31.5 |

TABLE 12-continued

| No. | | 12A | 12B | 12C | 12D | 12E | 12F | 12G |
|---|---|---|---|---|---|---|---|---|
| High melting metal | As (wt %) | 6.9 | 6.9 | 6.2 | 8.7 | 6.6 | 8.2 | 7.5 |
| | Ni (wt %) | | | 11.5 | | 12.3 | 13.3 | |
| Inorganic filler | Carbon (wt %) | | | | | 2.7 | | |
| | graphite (wt %) | 8.4 | 4.2 | 5.1 | | | | 2.0 |
| | Ni coated graphite (wt %) | | | | 5.6 | | | |
| | Talc (wt %) | | | | | | | |
| | BN (wt %) | | 3.5 | | | | | |
| | CuO (wt %) | | | | | | | 10.1 |
| Resistance (KΩ) | | 1.2 | 5.6 | 0.432 | 2.13 | 0.39 | 0.24 | 1.84 |
| TCR (ppm/° C.) | | −1200 | −2600 | −80 | +80 | −180 | −10 | −1380 |
| Remelt temperature (° C.) | | 260 | 260 | 260 | 260 | 260 | 260 | 260 |
| Resistance change after 15 themial shocks | | 1% | 6% | — | — | — | — | — |

Example 13

A comparison of the resistance measurements on one square resistor samples with and without copper leads was made. The resistor compositions used in this example are 9D, 11B, and 11E, which are described in Examples 9 and 11. The resistor samples without leads were produced using stencil printing, while the resistor samples with copper leads were prepared by screen printing the resistor compositions onto the designed pattern. Both types of the samples were dried at 120° C. for 5 minutes in a convection oven and subsequently cured in a condensation oven at 215° C. for 15 minutes. The resistance values were taken using a multimeter and the values for TCR were measured in the temperature range 20° C. to 80° C. The results are shown in Table 13.

TABLE 13

| No. | Sheet Resistance (Ω/□) at 20° C. without leads | Sheet Resistance (Ω/□) at 20° C. with leads | $TCR_{20-80° C.}$ (ppm/° C.) without leads | $TCR_{20-80° C.}$ (ppm/° C.) with leads |
|---|---|---|---|---|
| 9D | 58.8 | 67.2 | −756 | −580 |
| 11B | 320 | 275.2 | −1000 | −800 |
| 11E | 434 | 178.4 | −70 | −70 |

Example 14

This example presents a demonstration of producing embedded resistors using the invention resistor compositions. The same test samples used in Example 13 were used in this example. A polyimide dielectric film with a thickness of 1.5 mil was laminated on the test boards to create embedded resistors with copper leads. Subsequently, the polyimide dielectric layer was cured at 150° C. for 1 hour. The properties of the embedded resistors were then tested. The results are reported in Table 14.

TABLE 14

| Embedded resistors | Sheet Resistance (Ω/□) at 20° C. | $TCR_{20° C.-80° C.}$ (ppm/° C.) |
|---|---|---|
| 11B | 210.6 | −800 |
| 11E | 176.0 | −220 |

Example 15

This example presents a comparison between a TLPS resistor and a commercial carbon resistor, with regard to their tolerance and reliability. The TLPS resistor composition is 12A, which is described in Example 12. The test samples were prepared by screen printing the resistor pastes on a test board to obtain 2 mm×2 mm square resistors on copper leads. The reliability of the cured parts was tested by measuring the resistance change during 15 shocks from room temperature to 215° C. The tolerance of the resistors was obtained by measuring the variation of the resistance on the same test board.

TABLE 15

| Samples | Sheet Resistance (Ω/□) | Tolerance | Resistance change after 15 thermal shocks from 20° C. to 215° C. |
|---|---|---|---|
| TLPS resistor 12A | 550 | 10% | 1% |
| Carbon resistor A | 2960 | 10% | 55% |

While the invention has been described in detail with reference to certain preferred embodiments thereof, it will be understood that modifications and variations are within the spirit and scope of that which is described and claimed.

That which is claimed is:

1. A composition useful for the preparation of resistor and/or thermistor elements, said composition comprising
   (a) 15–100 wt % of a combination of Se, and one or more of Sn, Bi or Pb, and alloys thereof, having a melting temperature <300°,
   (b) 0–85 wt % of a high melting point metal material selected from Fe, Mo, W, Co, Mg, Cu. As, Ag, Ni, Au, Al, Pt, Te, Cd, NiTe, NiS, NiSn or alloys of any two or more thereof, having a melting temperature >300° C.,
   (c) 0–85 wt % of a binder system, and
   (d) 0–85 wt % of an inorganic filler,
   wherein, upon curing on to a suitable substrate, said composition is either a resistor characterized by having a wide range of resistance values and low values for temperature coefficient of resistance (TCR), or a thermistor element characterized by having a large value for temperature coefficient of resistance (TCR).

2. A composition useful for the preparation of resistor and/or thermistor elements, said composition comprising
   (a) 30–85 wt % of a combination of Se, and one or more of Sn, Di or Pb, and alloys thereof, having a melting temperature <300° C.,
   (b) 5–45 wt % of a high melting point metal material selected from Fe, Mo, W, Co, Mg, Cu, As. Ag, Ni, Au, Al, Pt, Te, Cd, NiTe, NiS, NiSn or alloys of any two or more thereof having a melting temperature >300° C.,
   (c) 15–40 wt % of a binder system, and
   (d) 2–20 wt % of an inorganic filler,
   wherein, upon curing on to a suitable substrate, said composition is either a resistor characterized by having a wide range of resistance values and low values for temperature coefficient of resistance (TCR), or a thermistor element characterized by having a large value for temperature coefficient of resistance (TCR).

3. A composition according to claim 1 comprising:
   (a) about 44.5 wt % Se, about 44.6 wt % BiSn, and
   (b) about 11 wt % As.

4. A composition according to claim 1 comprising:
   (a) about 85 wt % of a metallic powder mixture comprising.
      (i) about 44.5 wt % Se, about 44.6 wt % BiSn, and
      (ii) about 11 wt % As,
   (b) about 15 wt % acetone.

5. A composition according to claim 1 wherein said binder system includes a polymer binder.

6. A composition according to claim 1 wherein said binder system includes a solvent, polymer, curing agent, fluxing agent, thermoset resin, or mixture of any two or more thereof.

7. A composition according to claim 1 wherein the inorganic filler is a fine inorganic powder.

8. A composition according to claim 7 wherein said fine inorganic powder is selected from graphite, carbon, BN, $Al_2O_3$, $SnO_2$, $TiO_2$, CuO, $Cu_2O$, $Nb_2O_3$, $MoSi_2$ or $As_2Se_3$.

9. A composition useful for the preparation of thermistor elements, said composition comprising:
   (a) about 85 wt % of a metallic powder mixture comprising:
      (i) about 80–90 wt % of a low melting point metal comprising Se, and one or more of Sn, Bi or Pb, and alloys thereof, having a melting temperature <300° C., and
      (ii) about 10–20 wt % of a high melting metal material selected from Fe, Mo, W, Co, Mg, Cu, As, Ag, Ni, Au, Al, Pt, Te, Cd, NiTe, NiS, NiSn or alloys of any two or more thereof having a melting temperature >300° C.,
   (b) about 15 wt % of acetone,
   wherein, upon curing on to a suitable substrate, said composition is a thermistor element characterized by having a large value for temperature coefficient of resistance (TCR).

10. A composition useful for the preparation of thermistor elements, said composition comprising:
    (a) in the range of about 75 up to about 85 wt % of a low melting point metal material containing Se, and one or more of Sn, Bi or Pb, and allows thereof having a melting temperature <300° C.,
    (b) in the range of about 15 up to about 25 wt % of a polymer binder,
    wherein, upon curing on to a suitable substrate, said composition is a thermistor element characterized by having a large value for temperature coefficient of resistance (TCR).

11. A composition according to claim 10 comprising:
    (a) about 81.6 wt % of said low melting point metal material comprising:
       (i) about 40.8 wt % of Se,
       (ii) about 40.8 wt % of BiSn,
    (b) about 18.4 wt % of said polymer binder comprising:
       (i) about 18.9 wt % epoxy resin,
       (ii) about 54.2 wt% of a protected curing agent,
       (iii) about 25.2 wt % of a solvent, and
       (iv) about 1.7 wt % of a rheological modifier.

12. A composition according to claim 10 comprising:
    (a) about 80.8 wt % of said low melting point metal material comprising:
       (i) about 45.4 wt % of Se,
       (ii) about 35.4 wt % of BiSn,
    (b) about 19.1 wt % of said polymer binder comprising:
       (i) about 18.9 wt % epoxy resin,
       (ii) about 54.2 wt% of a protected curing agent,
       (iii) about 25.2 wt % of a solvent, and
       (iv) about 1.7 wt % of a rheological modifier.

13. A composition according to claim 10 comprising:
    (a) about 80.1 wt % of said low melting point metal material comprising:
       (i) about 50.6 wt % of Se,
       (ii) about 29.5 wt % of BiSn,
    (b) about 19.9 wt % of said polymer binder comprising:
       (i) about 18.9 wt % epoxy resin,
       (ii) about 54.2 wt % of a protected curing agent,
       (iii) about 25.2 wt % of a solvent, and
       (iv) about 1.7 wt % of a rheological modifier.

14. A composition according to claim 10 comprising:
    (a) about 79.2 wt % of said low melting point metal material comprising:
       (i) about 56.1 wt % of Se,
       (ii) about 23.1 wt % of BiSn,
    (b) about 20.8 wt % of said polymer binder comprising:
       (i) about 18.9 wt % epoxy resin,
       (ii) about 54.2 wt% of a protected curing agent, p2 (iii) about 25.2 wt % of a solvent, and
       (iv) about 1.7 wt % of a rheological modifier.

15. A composition useful for the preparation of thermistor elements, said composition comprising:
    (a) in the range of about 35 up to about 80 wt % of a low melting point metal material containing Se, and one, or more of Sn, Bi or Pb, and alloys thereof, having a melting temperature <300° C., (b) in the range of about 5 up to about 50 wt % of a high melting metal material selected from Fe, Mo, W, Co, Mg, Cu, As, Ag, Ni, Au, Al, Pt, Te, Cd, NiTe, NiS, NiSn or alloys of any two or more thereof having a melting temperature >300° C., (c) in tie range of about 15 up to about 25 wt % of a polymer binder, wherein, upon curing on to a suitable substrate, said composition is a thermistor element characterized by having a large value for temperature coefficient of resistance (TCR).

16. A composition according to claim 15 comprising:
   (a) about 74.4 wt % of said low melting point metal material comprising:
      (i) about 37.2 wt % of Se,
      (ii) about 37.2 wt % of BiSn,
   (b) about 8.9 wt % of As, and
   (c) about 16.7 wt % of said polymer binder comprising;
      (i) about 18.9 4 wt % epoxy resin,
      (ii) about 54.2 wt % of a protected curing agent,
      (iii) about 25.2 wt % of a solvent, and
      (iv) about 1.7 wt % of a rheological modifier.

17. A composition according to claim 15 comprising:
   (a) about 69 wt % of said low melting point metal material comprising:
      (i) about 43.6 wt % of Se,
      (ii) about 25.4 wt % of BiSn,
   (b) about 10.6 wt % of As, and
   (c) about 20.4 wt % of said polymer binder comprising:
      (i) about 18.9 wt % epoxy resin,
      (ii) about 54.2 wt % of a protected curing agent,
      (iii) about 25.2 wt % of a solvent, and
      (iv) about 1.7 wt % of a rheological modifier.

18. A composition according to claim 15 comprising:
   (a) about 69.4 wt % of said low melting point metal material comprising:
      (i) about 39 wt % of Se,
      (ii) about 30.4 wt % of BiSn,
   (b) about 11.3 wt % of As, and
   (c) about 19.4 wt % of said polymer binder comprising:
      (i) about 18.9 wt % epoxy resin,
      (ii) about 54.2 wt % of a protected curing agent,
      (iii) about 25.2 wt % of a solvent, and
      (iv) about 1.7 wt % of a rheological modifier.

19. A composition according to claim 15 comprising:
   (a) about 66.3 wt % of said low melting point metal material comprising:
      (i) about 41.9 wt % of Se,
      (ii) about 24.4 wt % of BiSn,
   (b) about 14.2 wt % of As, and
   (c) about 16.5 wt % of said polymer binder comprising:
      (i) about 18.9 wt % epoxy resin,
      (ii) about 54.2 wt % of a protected curing agent,
      (iii) about 25.2 wt % of a solvent, and
      (iv) about 1.7 wt % of a rheological modifier.

20. A composition according to claim 15 comprising:
   (a) about 70.6 wt % of said low melting point metal material comprising:
      (i) about 35.3 wt % of Se,
      (ii) about 35.3 wt % of BiSn,
   (b) about 13.5 wt % of Sb, and
   (c) about 15.9 wt % of said polymer binder comprising:
      (i) about 18.9 wt % epoxy resin,
      (ii) about 54.2 wt % of a protected curing agent,
      (iii) about 25.2 wt % of a solvent, and
      (iv) about 1.7 wt % of a rheological modifier.

21. A composition according to claim 15 comprising:
   (a) about 35.3 wt % of BiSn,
   (b) about 47.3 wt % of Te, and
   (c) about 16.4 wt % of said polymer binder comprising,
      (i) about 18.9 wt % epoxy resin,
      (ii) about 54.2 wt % of a protected curing agent,
      (iii) about 25.2 wt % of a solvent, and
      (iv) about 1.7 wt % of a rheological modifier.

22. A composition according to claim 15 comprising:
   (a) about 71.8 wt % of said low melting point metal material comprising:
      (i) about 35.9 wt % of Se,
      (ii) about 35.9 wt % of BiSn,
   (b) about 12 wt % of NiS, and
   (c) about 16.2 wt % of said polymer binder comprising:
      (i) about 18.9 wt % epoxy resin,
      (ii) about 54.2 wt % of a protected curing agent,
      (iii) about 25.2 wt % of a solvent, and
      (iv) about 1.7 wt % of a rheological modifier.

23. A composition useful for the preparation of thermistor elements, said composition comprising:
   (a) in the range of about 25 up to about 70 wt % of a low melting point metal material containing Se, and one or more of Sn, Bi, In or Pb, and alloys thereof, having a melting temperature <300° C.
   (b) in the range of about 5 up to about 60 wt % of a high melting metal material selected from Fe, Mo, W, Co, Mg, Cu, As, Ag, Ni, Au, Al, Pt, Te, Cd, NiTe, NiS, NiSn or alloys of any two or more thereof having a melting temperature >300° C.,
   (c) in the range of about 15 up to about 25 wt % of a polymer binder, and
   (d) optionally, in the range of about 2 up to about 10 wt % of an inorganic filler, wherein, upon curing on to a suitable substrate, said composition is a thermistor element characterized by having a large value for temperature coefficient of resistance (TCR).

24. A composition according to claim 23 comprising:
   (a) about 58.6 wt % of said low melting point metal material comprising:
      (i) about 29.3 wt % of Se,
      (ii) about 29.3 wt % of BiSn,
   (b) about 23.4 wt % of said high melting point metal material comprising:
      (i) about 7.0 wt % of As,
      (ii) about 16.4 wt % of Te, and
   (c) about 18.0 wt % of said polymer binder comprising:
      (i) about 18.9 wt % epoxy resin,
      (ii) about 54.2 wt % of a protected curing agent,
      (iii) about 25.2 wt % of a solvent, and
      (iv) about 1.7 wt % of a rheological modifier.

25. A composition according to claim 23 comprising:
   (a) about 65.4 wt % of said low melting point metal material comprising:
      (i) about 32.7 wt % of Se,
      (ii) about 32.7 wt % of BiSn,
   (b) about 14.4 wt % of said high melting point metal material comprising:
      (i) about 7.9 .wt % of As,
      (ii) about 6.5 wt % of Zn, and
   (c) about 20.2 wt % of said polymer binder comprising:

(i) about 18.9 wt % epoxy resin,
(ii) about 54.2 wt % of a protected curing agent,
(iii) about 25.2 wt % of a solvent, and
(iv) about 1.7 wt % of a rheological modifier.

26. A composition according to claim 23 comprising:
(a) about 57 wt % of said low melting point metal material comprising:
  (i) about 28.5 wt % of Se,
  (ii) about 28.5 wt % of BiSn,
(b) about 13.9 wt % of said high melting point metal material comprising:
  (i) about 6.8 wt % of As,
  (ii) about 17.1 wt % of Zn, and
(c) about 19.1 wt % of said polymer binder comprising:
  (i). about 18.9 wt % epoxy resin,
  (ii) about 54.2 wt % of a protected curing agent,
  (iii) about 25.2 wt % of a solvent, and
  (iv) about 1.7 wt % of a rheological modifier.

27. A composition according to claim 23 comprising:
(a) about 61.4 wt % of said low melting point metal material comprising:
  (i) about 30.7 wt % of Se,
  (ii) about 30.7 wt % of BiSn,
(b) about 19.7 wt % of said high melting point metal material comprising:
  (i) about 7.3 wt % of As,
  (ii) about 12.4 wt % of Fe, and
(c) about 18.9 wt % of said polymer binder comprising:
  (i) about 18.9 wt % epoxy resin,
  (ii) about 54.2 wt % of a protected curing agent,
  (iii) about 25.2 wt % of a solvent, and
  (iv) about 1.7 wt % of a rheological modifier.

28. A composition according to claim 23 comprising:
(a) about 67.2 wt % of said low melting point metal material comprising:
  (i) about 33.6 wt % of Se,
  (ii) about 33.6 wt % of BiSn,
(b) about 12 wt % of said high melting point metal material comprising:
  (i) about 8.1 wt % of As,
  (ii) about 3.9 wt % of Mg, and
(c) about 20.8 wt % of said polymer binder comprising:
  (i) about 18.9 wt % epoxy resin,
  (ii) about 54.2 wt % of a protected curing agent,
  (iii) about 25.2 wt % of a solvent, and
  (iv) about 1.7 wt % of a rheological modifier.

29. A composition according to claim 23 comprising:
(a) about 28.4 wt % of said low melting point metal material comprising:
  (i) about 24.2 wt % of Se,
  (ii) about 24.2 wt % of BiSn,
(b) about 36.6 wt % of said high melting point metal material comprising:
  (i) about 5.8 wt % of As,
  (ii) about 30.8 wt % of W, and
(c) about 15 wt % of said polymer binder comprising:
  (i) about 18.9 wt % epoxy resin,
  (ii) about 54.2 wt % of a protected curing agent,
  (iii) about 25.2 wt % of a solvent, and
  (iv) about 1.7 wt % of a rheological modifier.

30. A composition according to claim 23 comprising:
(a) about 63.2 wt % of said low melting point metal material comprising:
  (i) about 27.1 wt % of Se,
  (ii) about 27.1 wt % of BiSn,
  (iii) about 9.0 wt % of In,
(b) about 18.6 wt % of said high melting point metal material comprising:
  (i) about 6.5 wt % of As,
  (ii) about 12.1 wt % of Zn, and
(c) about 18.2 wt % of said polymer binder comprising:
  (i) about 18.9 wt % epoxy resin,
  (ii) about 54.2 wt % of a protected curing agent,
  (iii) about 25.2 wt % of a solvent, and
  (iv) about 1.7 wt % of a rheological modifier.

31. A composition according to claim 23 comprising:
(a) about 63.2 wt % of said low melting point metal material comprising:
  (i) about 27.1 wt % of Se,
  (ii) about 27.1 wt % of BiSn,
  (iii) about 9.0 wt % of In,
(b) about 18.6 wt % of said high melting point metal material comprising:
  (i) about 6.5 wt % of As,
  (ii) about 12.1 wt % of Cd, and
(c) about 18.2 wt % of said polymer binder comprising:
  (i) about 18.9 wt % epoxy resin,
  (ii) about 54.2 wt % of a protected curing agent,
  (iii) about 25.2 wt % of a solvent, and
  (iv) about 1.7 wt % of a rheological modifier.

32. A composition according to claim 23 comprising:
(a) about 73.7 wt % of said low melting point metal material comprising:
  (i) about 24.4 wt % of Se,
  (ii) about 49.3 wt % of BiSn,
(b) about 5.1 wt % of said high melting point metal material comprising:
  (i) about 3.2 wt % of As,
  (ii) about 1.9 wt % of Al, and
(c) about 21.2 wt % of said polymer binder comprising:
  (i) about 18.9 wt % epoxy resin,
  (ii) about 54.2 wt % of a protected curing agent,
  (iii) about 25.2 wt % of a solvent, and
  (iv) about 1.7 wt % of a rheological modifier.

33. A composition according to claim 23 comprising:
(a) about 53.2 wt % of said low melting point metal material comprising:
  (i) about 26.6 wt % of Se,
  (ii) about 26.6 wt % of BiSn,
(b) about 28 wt % of said high, melting point metal material comprising:
  (i) about 6.4 wt % of As,
  (ii) about 11.9 wt % of Zn,
  (iii) about 10.7 wt % of Cu, and
  (c) about 17.8 wt % of said polymer binder comprising:
(i) about 18.9 wt % epoxy resin,
(ii) about 54.2 wt % of a protected curing agent,
(iii) about 25.2 wt % of a solvent, and
(iv) about 1.7 wt % of a rheological modifier.

34. A composition according to claim 23 comprising:
(a) about 43.6 wt % of said low melting point metal material comprising
  (i) about 18.0 wt % of Se,
  (ii) about 28.3 wt % of PbSn,
(b) about 37 wt % of said high melting point metal material comprising:

(i) about 4.2 wt % of As,
(ii) about 32.8 wt % of Te, and
(c) about 16.8 wt % of said polymer binder comprising:
(i) about 18.9 wt % epoxy resin,
(ii) about 54.2 wt % of a protected cuing agent,
(iii) about 25.2 wt % of a solvent, and
(iv) about 1.7 wt % of a rheological modifier.

35. A composition according to claim 23 comprising:
(a) about 63 wt % of said low melting point metal material comprising;
(i) about 31.5 wt % of Se,
(ii) about 31.5 wt % of BiSn,
(b) about 7.6 wt % of As,
(c) about 19.4 wt % of said polymer binder comprising:
(i) about 18.9 wt % epoxy resin,
(ii) about 54.2 wt % of a protected curing agent,
(iii) about 25.2 wt % of a solvent, and
(iv) about 1.7 wt % of a rheological modifier, and
(d) about 10.0 wt % of an inorganic filler comprising CuO.

36. A composition according to claim 23 comprising:
(a) about 65 wt % of said low melting point metal material comprising:
(i) about 32.5 wt % of Se,
(ii) about 32.5 wt % of BiSn,
(b) about 7.8 wt % of As,
(c) about 20 wt % of said polymer binder comprising:
(i) about 18.9 wt % epoxy resin,
(ii) about 54.2 wt % of a protected curing agent,
(iii) about 25.2 wt % of a solvent, and
(iv) about 1.7 wt % of a rheological modifier, and
(d) about 7.2 wt % of an inorganic filler comprising $Nb_2O_5$.

37. A composition according to claim 23 comprising:
(a) about 63 wt % of said low melting point metal material comprising:
(i) about 31.5 wt % of Se,
(ii) about 31.5 wt % of BiSn,
(b) about 7.6 wt % of As,
(c) about 19.4 wt % of said polymer binder comprising:
(i) about 18.9 wt % epoxy resin,
(ii) about 54.2 wt % of a protected curing agent,
(iii) about 25.2 wt % of a solvent, and
(iv) about 1.7 wt % of a rheological modifier, and
(d) about 10.0 wt % of an inorganic filler comprising $MoSi_2$.

38. A composition according to claim 23 comprising:
(a) about 65 wt % of said low melting point metal material comprising:
(i) about 32.5 wt % of Se,
(ii) about 32.5 wt % of BiSn,
(b) about 7.8 wt % of As,
(c) about 20 wt % of said polymer binder comprising:
(i) about 18.9 wt % epoxy resin,
(ii) about 54.2 wt % of a protected curing agent,
(iii) about 25.2 wt % of a solvent, and
(iv) about 1.7 wt % of a rheological modifier, and
(d) about 7.2 wt % of an inorganic filler comprising $TiO_2$.

39. A composition according to claim 23 comprising:
(a) about 57 wt % of said low melting point metal material comprising:
(i) about 28.5 wt % of Se,
(ii) about 28.5 wt % of BiSn,
(b) about 19.3 wt % of said high melting point metal material comprising:
(i) about 6.6 wt % of As,
(ii) about 12.7 wt % of Zn,
(c) about 18.9 wt % of said polymer binder comprising:
(i) about 18.9 19 wt % epoxy resin,
(ii) about 54.2 wt % of a protected curing agent,
(iii) about 25.2 wt % of a solvent, and
(iv) about 1.7 wt % of a rheological modifier, and
(d) about 4.8 wt % of an inorganic filler comprising $TiO_2$.

40. A composition according to claim 23 comprising:
(a) about 47.4 wt % of said low melting point metal material comprising:
(i) about 23.7 wt % of Se,
(ii) about 23.7 wt % of BiSn,
(b) about 34.9 wt % of said high melting point metal material comprising:
(i) about 5.6 wt % of As,
(ii) about 10.6 wt % of Zn,
(iii) about 18.7 wt % of Ag,
(c) about 19.9 wt % of said polymer binder comprising:
(i) about 18.9 wt % epoxy resin,
(ii) about 54.2 wt % of a protected curing agent,
(iii) about 25.2 wt % of a solvent, and
(iv) about 1.7 wt % of a rheological modifier, and
(d) about 8.2 wt % of an inorganic filler comprising Bn.

41. A composition according to claim 23 comprising:
(a) about 56.6 wt % of said low melting point metal material comprising:
(i) about 28.3 wt % of Se,
(ii) about 28,3 wt % of BiSn,
(b) about 19.4 wt % of said high melting point metal material comprising:
(i) about 6.8 wt % of As,
(ii) about 12.6 wt % of Zn,
(c) about 21.2 wt % of said polymer binder comprising:
(i) about 18.9 wt % epoxy resin,
(ii) about 54.2 wt % of a protected curing agent,
(iii) about 25.2 wt % of a solvent, and
(iv) about 1.7 wt % of a rheological modifier, and
(d) about 2.8 wt % of an inorganic filler comprising graphite.

42. A composition according to claim 23 comprising:
(a) about 57 wt % of said low melting point metal material comprising:
(i) about 28.5 wt % of Se,
(ii) about 28.5 wt % of BiSn,
(b) about 19.3 wt % of said high melting point metal material comprising:
(i) about 6.6 wt % of As,
(ii) about 12.7 wt % of Zn,
(c) about 18.9 wt % of said polymer binder comprising:
(i) about 18.9 wt % epoxy resin,
(ii) about 54.2 wt % of a protected curing agent,
(iii) about 25.2 wt % of a solvent, and
(iv) about 1.7 wt % of a rheological modifier, and
(d) about 4.8 wt % of an inorganic filler comprising $As_2Se_3$.

43. A composition useful for the preparation of resistor elements, said composition comprising:
(a) in the range of about 70 up to about 85 wt % of a low melting point metal material containing Se, and one or more of Sn, Bi or Pb, and alloys thereof, having a melting temperature <300° C., (b) in the range of about 15 up to about 30 wt % of a polymer binder, wherein, upon curing on to a suitable substrate, said composition is a resistor characterized by having a wide range of resistance values and low values for temperature coefficient of resistance (TCR).

44. A composition according to claim 43 comprising:
    (a) about 83.4 wt % of said low melting point metal material comprising:
        (i) about 36.9 wt % of Se,
        (ii) about 46.5 wt % of BiSn,
    (b) about 16.6 wt % of said polymer binder comprising:
        (i) about 18.9 wt % epoxy resin,
        (ii) about 54.2 wt % of a protected curing agent,
        (iii) about 25.2 wt % of a solvent, and
        (iv) about 1.7 wt % of a rheological modifier.

45. A composition according to claim 43 comprising:
    (a) about 84.6 wt % of said low melting point metal material comprising:
        (i) about 55.5 wt % of Se,
        (ii) about 29.1 wt % of BiSn,
    (b) about 15.4 wt % of said polymer binder comprising:
        (i) about 18.9 wt % epoxy resin,
        (ii) about 54.2 wt % of a protected curing agent,
        (iii) about 25.2 wt % of a solvent, and
        (iv) about 1.7 wt % of a rheological modifier.

46. A composition according to claim 43 comprising;
    (a) about 85.1 wt % of said low melting point metal material comprising
        (i) about 25.5 wt % of Se,
        (ii) about 59.6 wt % of BiSn,
    (b) about 14.9 wt % of said polymer binder comprising:
        (i) about 18.9 wt % epoxy resin,
        (ii) about 54.2 wt % of a protected curing agent,
        (iii) about 25.2 wt % of a solvent, and
        (iv) about 1.7 wt % of a rheological modifier.

47. A composition according to claim 43 comprising:
    (a) about 84.7 wt % of said low melting point metal material comprising:
        (i) about 33.9 wt % of Se,
        (ii) about 33.9 wt % of BiSn,
        (iii) about 16.9 wt % of Sn,
    (b) about 15.3 wt % of said polymer binder comprising:
        (i) about 18.9 wt % epoxy resin,
        (ii) about 54.2 wt % of a protected curing agent,
        (iii) about 25.2 wt % of a solvent, and
        (iv) about 1.7 wt % of a rheological modifier.

48. A composition according to claim 43 comprising:
    (a) about 80.4 wt % of said low melting point metal material comprising:
        (i) about 37.6 wt % of Se,
        (ii) about 42.8 wt % of PbSn,
    (b) about 19.6 wt % of said polymer binder comprising:
        (i) about 18.9 wt % epoxy resin,
        (ii) about 54.2 wt % of a protected curing agent,
        (iii) about 25.2 wt % of a solvent, and
        (iv) about 1.7 wt % of a rheological modifier.

49. A composition useful for the preparation of resistor elements, said composition comprising:
    (a) in the range of about 20 up to about 85 wt % of a low melting point metal material containing Se, and one or more of Sn, Bi or Pb, and allows thereof having a melting temperature <300° C.,
    (b) in the range of about 2 up to about 60 wt % of a high melting metal material selected from Fe, Mo, W, Co, Mg, Cu, As, Ag, Ni, Au, Al, Pt, Te, Cd, NiTe, NiS, NiSn or alloys of any two or more thereof having a melting temperature >300° C.,
    (c) in the range of about 15 up to about 30 wt % of a polymer binder, and
    (d) optionally, in the range of about 2 up to about 10 wt % of an inorganic filler, wherein, upon curing on to a suitable substrate, said composition is a resistor characterized by having a wide range of resistance values and low values for temperature coefficient of resistance (TCR).

50. A composition according to claim 49 comprising:
    (a) about 74.4 wt % of said low melting point metal material comprising:
        (i) about 37.2 wt % of Se,
        (ii) about 37.2 wt % of BiSn,
    (b) about 8.9 wt % of As, and
    (c) about 16.7 wt % of said polymer binder comprising:
        (i) about 18.9 wt % epoxy resin,
        (ii) about 54.2 wt % of a protected curing agent.
        (iii) about 25.2 wt % of a solvent, and
        (iv) about 1.7 wt % of a rheological modifier.

51. A composition according to claim 49 comprising.
    (a) about 70.6 wt % of said low melting point metal material comprising:
        (i) about 35.3 wt % of Se,
        (ii) about 35.3 wt % of BiSn,
    (b) about 13.7 wt % of Sb, and
    (c) about 15.7 wt % of said polymer binder comprising:
        (i) about 18.9 wt % epoxy resin,
        (ii) about 54.2 wt % of a protected curing agent,
        (iii) about 25.2 wt % of a solvent, and
        (iv) about 1.7 wt % of a rheological modifier.

52. A composition according to claim 49 comprising:
    (a) about 82.2 wt % of said low melting point metal material comprising:
        (i) about 12.8 wt % of Se,
        (ii) about 69.4 wt % of BiSn,
    (b) about 2.9 wt % of As, and
    (c) about 14.9 wt % of said polymer binder comprising:
        (i) about 18.9 wt % epoxy resin,
        (ii) about 54.2 wt % of a protected curing agent,
        (iii) about 25.2 wt % of a solvent, and
        (iv) about 1.7 wt % of a rheological modifier.

53. A composition according to claim 49 comprising:
    (a) about 71.8 wt % of said low melting point metal material comprising:
        (i) about 35.9 wt % of Se,
        (ii) about 35.9 wt % of BiSn,
    (b) about 12 wt % of Fe, and
    (c) about 16.2 wt % of said polymer binder comprising:
        (i) about 18.9 wt % epoxy resin,
        (ii) about 54.2 wt % of a protected curing agent,
        (iii) about 25.2 wt % of a solvent, and
        (iv) about 1.7 wt % of a rheological modifier.

54. A composition according to claim 49 comprising:
    (a) about 70.6 wt % of said low melting point metal material comprising:
        (i) about 35.3 wt % of Se,
        (ii) about 35.3 wt % of PbSn,
    (b) about 5.9 wt % of Ni, and
    (c) about 23.5 wt % of said polymer binder comprising:
        (i) about 18.9 wt % epoxy resin,
        (ii) about 54.2 wt % of a protected curing agent, (iii) about 25.2 wt % of a solvent, and
(iv) about 1.7 wt % of a rheological modifier.

55. A composition useful for the preparation of resistor elements, said composition comprising:
(a) in the range of about 50 up to about 65 wt % of a low melting point metal material containing Se, and one or more of Sn, Bi or Pb, and alloys thereof having a melting temperature <300° C.,
(b) in the range of about 10 up to about 35 wt % of a high melting metal material containing Fe, Mo, W, Co, Mg, Cu, As, Ag, Ni, Au, Al, Pt, Te, Cd, NiTe, NiS, NiSn or alloys of any two or more thereof having a melting temperature >300° C.,
(c) in the range of about 15 up to about 25 wt % of a polymer binder, wherein, upon curing on to a suitable substrate, said composition is a resistor characterized by having a wide range of resistance values and low values for temperature coefficient of resistance (TCR).

56. A composition according to claim 55 comprising:
(a) about 60.4 wt % of said low melting point metal material comprising:
(i) about 30.2 wt % of Se,
(ii) about 30.2 wt % of BiSn,
(b) about 20.9 wt % of said high melting point metal material comprising:
(i) about 7.2 wt % of As,
(ii) about 13.7 wt % of NiTe,
(c) about 18.7 wt % of said polymer binder comprising:
(i) about 18.9 wt % epoxy resin,
(ii) about 54.2 wt % of a protected curing agent,
(iii) about 25.2 wt % of a solvent, and
(iv) about 1.7 wt % of a rheological modifier.

57. A composition according to claim 55 comprising:
(a) about 60.4 wt % of said low melting point metal material comprising:
(i) about 30.2 wt % of Se,
(ii) about 30.2 wt % of BiSn,
(b) about 20.9 wt % of said high melting point metal material comprising:
(i) about 7.2 wt % of As,
(ii) about 13.7 wt % of Ni,
(c) about 18.7 wt % of said polymer binder comprising:
(i) about 18.9 wt % epoxy resin,
(ii) about 54.2 wt % of a protected curing agent,
(iii) about 25.2 wt % of a solvent, and
(iv) about 1.7 wt % of a rheological modifier.

58. A composition according to claim 55 comprising:
(a) about 63.6 wt % of said low melting point metal material comprising:
(i) about 21.1 wt % of Se,
(ii) about 42.5 wt % of BiSn,
(b) about 18 wt % of said high melting point metal material comprising:
(i) about 2.7 wt % of As,
(ii) about 13.7 wt % of Ni,
(iii) about 1.6 wt % of Al,
(c) about 18.4 wt % of said polymer binder comprising:
(i) about 18.9 wt % epoxy resin,
(ii) about 54.2 wt % of a protected curing agent,
(iii) about 25.2 wt % of a solvent, and
(iv) about 1.7 wt % of a rheological modifier.

59. A composition according to claim 55 comprising:
(a) about 56 wt % of said low melting point metal material comprising:
(i) about 28 wt % of Se,
(ii) about 28 wt % of BiSn,
(b) about 26.7 wt % of said high melting point metal material comprising:
(i) about 6.7 wt % of As,
(ii) about 12.5 wt % of Ni,
(iii) about 7.5 wt % of Te,
(c) about 17.3 wt % of said polymer binder comprising:
(i) about 18.9 wt % epoxy resin,
(ii) about 54.2 wt % of a protected curing agent,
(iii) about 25.2 wt % of a solvent, and
(iv) about 1.7 wt % of a rheological modifier.

60. A composition according to claim 55 comprising:
(a) about 57.5 wt % of said low melting point metal material comprising:
(i) about 21.2 wt % of Se,
(ii) about 36.3 wt % of BiSn,
(b) about 23 wt % of said high melting point metal material comprising:
(i) about 8.8 wt % of As,
(ii) about 14.2 wt % of Ni,
(c) about 19.6 wt % of said polymer binder comprising:
(i) about 18.9 wt % epoxy resin,
(ii) about 54.2 wt % of a protected curing agent,
(iii) about 25.2 wt % of a solvent, and
(iv) about 1.7 wt % of a rheological modifier.

61. A composition according to claim 55 comprising:
(a) about 60 wt % of said low melting point metal material comprising:
(i) about 18 wt % of Se,
(ii) about 42 wt % of BiSn,
(b) about 23.2 wt % of said high melting point metal material comprising:
(i) about 6.0 wt % of As,
(ii) about 0.4 wt % of Ag,
(iii) about 16.8 wt % of Te,
(c) about 16.8 wt % of said polymer binder comprising:
(i) about 18.9 wt % epoxy resin,
(ii) about 54.2 wt % of a protected curing agent,
(iii) about 25.2 wt % of a solvent, and
(iv) about 1.7 wt % of a rheological modifier.

62. A composition according to claim 55 comprising:
(a) about 69.1 wt % of said low melting point metal material comprising:
(i) about 22.9 wt % of Se,
(ii) about 46.2 wt % of BiSn,
(b) about 11 wt % of said high melting point metal material comprising;
(i) about 3.0 wt % of As,
(ii) about 6.0 wt % of Ni,
(iii) about 2.0 wt % of Cu,
(c) about 23 wt % of said polymer binder comprising:
(i) about 18.9 wt % epoxy resin,
(ii) about 54.2 wt % of a protected curing agent,
(iii) about 25.2 wt % of a solvent, and
(iv) about 1.7 wt % of a rheological modifier.

63. A composition useful for the preparation of resistor elements, said composition comprising:
(a) in the range of about 40 up to about 70 wt % of a low melting point metal material containing Se, and one or more of Sn, Bi or Pb, and alloys thereof, having a melting temperature <300° C.,
(b) in the range of about 5 up to about 25 wt % of a high melting metal material containing Fe, Mo, W, Co, Mg, Cu, As, Ag, Ni, Au, Al, Pt, Te, Cd, NiTe, NiS, NiSn or alloys of any two or more thereof having a melting temperature >300° C., (c) in the range of about 15 up to about 30 wt % of a polymer binder, (d) in the range of about 2 up to about 15 wt % of an inorganic filler, wherein, upon curing on to a suitable substrate, said composition is a resistor characterized by having a wide range of resistance values and low values for temperature coefficient of resistance (TCR).

64. A composition according to claim 63 comprising:
   (a) about 57.4 wt % of said low melting point metal material comprising:
      (i) about 28.7 wt % of Se,
      (ii) about 28.7 wt % of BiSn,
   (b) about 6.9 wt % of As,
   (c) about 27.3 wt % of said polymer binder comprising:
      (i) about 18.9 wt % epoxy resin,
      (ii) about 54.2 wt % of a protected curing agent,
      (iii) about 25.2 wt % of a solvent, and
      (iv) about 1.7 wt % of a rheological modifier, and
   (d) about 8.4 wt % of an inorganic filler comprising graphite.

65. A composition according to claim 63 comprising:
   (a) about 57.8 wt % of said low melting point metal material comprising:
      (i) about 28.9 wt % of Se,
      (ii) about 28.9 wt % of BiSn,
   (b) about 6.9 wt % of As,
   (c) about 27.6 wt % of said polymer binder comprising:
      (i) about 18.9 wt % epoxy resin,
      (ii) about 54.2 wt % of a protected curing agent,
      (iii) about 25.2 wt % of a solvent, and
      (iv) about 1.7 wt % of a rheological modifier, and
   (d) about 7.7 wt % of an inorganic filler comprising:
      (i) about 4.2 wt % of graphite,
      (ii) about 3.5 wt % of Bn.

66. A composition according to claim 63 comprising:
   (a) about 51.4 wt % of said low melting point metal material comprising:
      (i) about 25.7 wt % of Se,
      (ii) about 25.7 wt % of BiSn,
   (b) about 17.7 wt % of said high melting point metal material comprising:
      (i) about 6.2 wt % of As,
      (ii) about 11.5 wt % of Ni,
   (c) about 25.7 wt % of said polymer binder comprising:
      (i) about 18.9 wt % epoxy resin,
      (ii) about 54.2 wt % of a protected curing agent,
      (iii) about 25.2 wt % of a solvent, and
      (iv) about 1.7 wt % of a rheological modifier, and
   (d) about 5.1 wt % of an inorganic filler comprising graphite.

67. A composition according to claim 63 comprising:
   (a) about 63.5 wt % of said low melting point metal material comprising.
      (i) about 35.7 wt % of Se,
      (ii) about 27.8 wt % of BiSn,
   (b) about 8.7 wt % of As,
   (c) about 22.2 wt % of said polymer binder comprising:
      (i) about 18.9 wt % epoxy resin,
      (ii) about 54.2 wt % of a protected curing agent,
      (iii) about 25.2 wt % of a solvent, and
      (iv) about 1.7 wt % of a rheological modifier, and
   (d) about 5.6 wt % of an inorganic filler comprising Ni.

68. A composition according to claim 63 comprising:
   (a) about 54.8 wt % of said low melting point metal material comprising:
      (i) about 27.4 wt % of Se,
      (ii) about 27.4 wt % of BiSn,
   (b) about 18.9 wt % of said high melting point metal material comprising:
      (i) about 6.6 wt % of As,
      (ii) about 12.3 wt % of Ni,
   (c) about 23.6 wt % of said polymer binder comprising:
      (i) about 18.9 wt % epoxy resin,
      (ii) about 54.2 wt % of a protected curing agent,
      (iii) about 25.2 wt % of a solvent, and
      (iv) about 1.7 wt % of a rheological modifier, and
   (d) about 2.7 wt % of an inorganic filler comprising carbon.

69. A composition according to claim 63 comprising:
   (a) about 54.0 wt % of said low melting point metal material comprising:
      (i) about 34.1 wt % of Se,
      (ii) about 19.9 wt % of BiSn,
   (b) about 21.5 wt % of said high melting point metal material comprising:
      (i) about 8.2 wt % of As,
      (ii) about 13.3 wt % of Ni,
   (c) about 22.5 wt % of said polymer binder comprising:
      (i) about 18.9 wt % epoxy resin,
      (ii) about 54.2 wt % of a protected curing agent,
      (iii) about 25.2 wt % of a solvent, and
      (iv) about 1.7 wt % of a rheological modifier, and
   (d) about 2 wt % of an inorganic filler comprising graphite.

70. A composition according to claim 63 comprising:
   (a) about 63.0 wt % of said low melting point metal material comprising:
      (i) about 31.5 wt % of Se,
      (ii) about 31.5 wt % of BiSn,
   (b) about 7.5 wt % of As,
   (c) about 19.4 wt % of said polymer binder comprising:
      (i) about 18.9 wt % epoxy resin,
      (ii) about 54.2 wt % of a protected curing agent,
      (iii) about 25.2 wt % of a solvent, and
      (iv) about 1.7 wt % of a rheological modifier, and
   (d) about 10.1 wt % of an inorganic filler comprising CuO.

* * * * *

UNITED STATES PATENT AND TRADEMARK OFFICE
CERTIFICATE OF CORRECTION

PATENT NO. : 5,980,785
DATED : November 9, 1999
INVENTOR(S) : Xi et al.

It is certified that error appears in the above-identified patent and that said Letters Patent is hereby corrected as shown below:

Column 21,
Line 23, change "Di" to -- Bi --

Column 22,
Line 61, following "agent," delete "p2"

Column 23,
Line 23, following "18.9" delete "4"

Column 26,
Line 50, following "high" delete the comma
Line 63, following the word "comprising," insert a colon -- comprising: --

Signed and Sealed this

Seventh Day of May, 2002

Attest:

JAMES E. ROGAN
Attesting Officer      Director of the United States Patent and Trademark Office